(12) United States Patent
Wong

(10) Patent No.: US 6,214,941 B1
(45) Date of Patent: Apr. 10, 2001

(54) WATER SOLUBLE POLYKETONES

(75) Inventor: Pui-Kwan Wong, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/191,032

(22) Filed: Nov. 12, 1998

Related U.S. Application Data

(60) Provisional application No. 60/066,425, filed on Nov. 24, 1997.

(51) Int. Cl.$^7$ .................................................. C08F 283/00
(52) U.S. Cl. .............................................................. 525/539
(58) Field of Search .............................................. 525/539

(56) References Cited

U.S. PATENT DOCUMENTS

| | | | |
|---|---|---|---|
| 2,457,279 | * 12/1948 | Scott | 525/539 |
| 2,527,821 | * 10/1950 | Johnson | 525/539 |
| 4,026,967 | 5/1977 | Flexman, Jr. et al. | 260/878 R |
| 4,762,890 | * 8/1988 | Strait et al. | 525/257 |
| 4,808,699 | 2/1989 | Van Broekhoven et al. | 528/392 |
| 4,826,932 | * 5/1989 | Wong | 525/539 |
| 4,868,282 | 9/1989 | Van Broekhoven et al. | 528/392 |
| 4,927,888 | 5/1990 | Strait et al. | 525/285 |
| 4,929,672 | 5/1990 | Laughner | 525/63 |
| 5,089,556 | * 2/1992 | Tabor et al. | 525/539 |
| 5,106,916 | * 4/1992 | Mitchell | 525/539 |
| 5,369,170 | * 11/1994 | Weinkauf | 525/539 |
| 5,591,410 | 1/1997 | Audureau et al. | 422/131 |
| 5,605,988 | * 2/1997 | Sinai-Zingde | 525/539 |
| 5,698,663 | * 12/1997 | Kinneberg | 525/539 |
| 6,133,356 | * 10/2000 | Wong | 525/539 |

OTHER PUBLICATIONS

B. C. Trivedi and B. M Culbertson, "Maleic Anhydride," Ashland Chemical Company, Dublin, Ohio, Plenum Press, New York and London, 8 pages., No Date Available.

\* cited by examiner

*Primary Examiner*—Philip Tucker

(57) ABSTRACT

A functionalized polyketone and a method to make this functionalized polyketone is provided, the method including the steps of: providing a polyketone; contacting the polyketone with a functional group containing monomer, the functional group containing monomer having a double bond between two carbons, at a temperature between about 180° C. and 275° C., for a time period effective for at least 10% by weight of the resultant grafted polymer to be grafted monomer units; and recovering the grafted polyketone.

10 Claims, No Drawings

# WATER SOLUBLE POLYKETONES

This application claims benefit of U.S. Provisional application Ser. No. 60/066,425 filed Nov. 24, 1997, the entire disclosure of which is hereby incorporated by reference.

FIELD OF THE INVENTION

The invention relates to a method to produce a polyketone grafted with functional group containing monomers, and the grafted polymer produced by the process.

BACKGROUND OF THE INVENTION

Grafting of maleic anhydrides to polymers by use of a free radical initiator is known, and polyketones are often included as a polymer to which such grafting could be accomplished. U.S. Pat. No. 4,927,888 is exemplary of such art. Grafting of such monomers as maleic anhydride to polymers is often done to impart sites for ionic bonding for to increase the hydrophilic nature of the compound, to provide a reactive site for further modification, or to improve bonding to polar substrates. The use of free radical initiators to accomplish such grafting results in considerable chain scission of the polymer, and the extent to which a monomer such as maleic anhydride can be incorporated onto the polymer chain is limited to an amount which is less than what would be desired for many uses.

U.S. Pat. No. 4,026,967 discloses an apparatus and method for grafting monomers such as maleic anhydride to polymers having backbones of ethylene and copolymers of ethylene and alpha olefins. Polyketones are included as suitable copolymers for such grafting. A dispersed plug flow reactor at 275° C. to 550° C. is used to achieve the grafting. The mechanism for the grafting is described as thermocracking, and as such considerable chain scission would be expected, and achieving more than two grafted monomer units on each remaining polymer molecule would not be expected.

It would be desirable to have a polyketone to which a significant amount of a polar monomer was grafted. It would further be desirable to have such a grafted polymer which was not subjected to significant chain scission. It is therefore an object of the present invention to provide such a polymer and to provide a method to produce such a polymer.

SUMMARY OF THE INVENTION

These and other objects are accomplished by a method to produce a grafted polyketone, the method comprising the steps of: providing a polyketone; contacting the polyketone with a functional group containing monomer, the functional group containing monomer having a double bond between two carbons, at a temperature between about 180° C. and 275° C., for a time period effective for at least 10 by weight of the resultant grafted polymer to be grafted monomer units; and recovering the grafted polyketone. In another aspect, the present invention also includes the product produced by this method.

The functional group containing monomer is preferably maleic anhydride, or a derivative thereof. The grafted polyketone of the present invention is water soluble at high pHs and is not water soluble at neutral and low pHs. The grafted polyketone of the present invention can be, for example, crosslinked with epoxy resins, and contains a high level of functionality, resulting in improved adhesion to polar substrates.

DESCRIPTION OF A PREFERRED EMBODIMENT

Copolymers of carbon monoxide and olefin which are employed in this invention are preferably of an alternating aliphatic structure and contain substantially one molecule of carbon monoxide for each molecule of olefin. Alternatively, random copolymers of olefins and carbon monoxide can be functionalized according to the present invention. Such random copolymers preferably have at least one ketone unit for each 20 carbon atoms in the backbone of the polymer, or at least 10 mole percent of carboxyl monomer units. Such polymers are referred to herein as "polyketones". Additional olefin comonomers can also be used and still come within the scope of polyketone polymers described herein. Such polyketone polymers are aliphatic in that there is an absence of aromatic groups along the polymer backbone. However, alternating polyketones may have aromatic groups substituted or added to side chains and yet still be considered alternating aliphatic polyketones. Preferred polyketones of the present invention are liquid polymers having number-average molecular weights of between about 1000 and about 5000, as measured by GPC. These preferred polyketones have olefin monomer units of ethylene and higher olefins, with between about 50% of the olefin units being ethylene. The olefin units that are not ethylene are preferably either propylene or butylene, and most preferably propylene.

The functional group containing monomer of the present invention is preferably maleic anhydride, or a derivative of maleic anhydride. Acceptable derivatives of maleic anhydride include substituted maleic anhydrides, and esters, salts and diacid forms of maleic anhydride. Other acceptable monomers include (meth)acrylic acid, fumaric acid, itaconic acid, crotonic acid, itaconic anhydride, and diethyl fumarate. The functional group is preferably a carboxyl group, but could be a sulfur or nitrogen containing group, such as a sulfonic acid group, a derivative of a sulfonic acid group, an amine, a cyanide or a thiol group.

Processes for the production of the polyketone polymers are illustrated by U.S. Pat. Nos. 4,808,699 and 4,868,282 to Van Broekhoven, et. al. which issued on Feb. 28, 1989 and Sep. 19, 1989 respectively and are incorporated herein by reference. Both patents teach the production of alternating polymers by contacting ethylene and carbon monoxide in the presence of a catalyst comprising a Group VIII metal compound, an anion of a nonhydrohalgenic acid and a bidentate phosphorous, arsenic or antimony ligand.

Grafting of the diacid monomer to the polyketone can be accomplished by combining the two and heating to a temperature of between about 180° C. and about 275° C. for a time period effective to result in least 10% by weight of the resulting grafted polymer being grafted monomer units. This time period may be, for example, 5 minutes to 3 hours. When the polyketone is a liquid polymer at grafting temperatures, the grafting can be accomplished without a solvent, but a solvent may be used to lower viscosity of the mixture and improve mixing of the components.

The resultant grafted polymer is preferably 10% to 30% by weight grafted monomer units.

The grafted polyketone of the present invention is water soluble when caustic is added, and generally becomes insoluble when in a neutral or acidic aqueous solution.

Grafting of acid monomers to the polyketone according to the present invention results in a polymer which can be crosslinked with epoxy resins to yield curable coatings or adhesives. Epoxy resins such as bisphenol A/epichlorohydrin based epoxy resins can be combined with the grafted resins of the present invention to provide a thermoset resin.

The grafted polymer of the present invention is not the product of a grafting process that results in significant scission, and therefore the grafted polymer has a relatively narrow and predictable range of molecular weights, and can be provided with a much greater level of functionalization than grafted polymers produced by higher temperature thermal grafting, or produced using free radical initiators.

Grafting of the polyketone according to the present invention with acid containing monomers results in intermolecular condensation, forming furan rings along the polymer backbone. Ten percent or more of the carbons atoms in the polymer backbone could be, for example, furan units. These furan units can be useful as an additional site for reactivity in the grafted polymer.

EXAMPLES

An alternating olefin-carbon monoxide copolymer was provided, the olefin units of the copolymer being 72% by weight propylene and 28% by weight ethylene, and the copolymer having a number average molecular weight of 1800. 100 grams of the polyketone was placed in a 300 ml autoclave equipped with a propeller stirrer, along with maleic anhydride, and heated at 200° C. The product was then analyzed by NMR. The Table below shows the amount of maleic anhydride, the time of the heating, the percent of the maleic anhydride grafted to the polyketone, and the percent of the ketone furanized by the process. Five examples all resulted in at least 70% of the maleic anhydride grafted to the polyketone.

| EXAMPLE | MALEIC ANHYDRIDE (g) | TIME (hr.) | % MA GRAFTED | % KETONE FURANIZED |
|---|---|---|---|---|
| 1 | 20 | 0.5 | 78 | 61 |
| 2 | 20 | 1 | 82 | 64 |
| 3 | 20 | 2 | 86 | 67 |
| 4 | 50 | 1 | 75 | 71 |

I claim:

1. A method to produce a grafted polyketone, the method comprising the steps of:

providing a polyketone;

contacting the polyketone with a functional group containing monomer, the functional group containing monomer having a double bond between two carbons, at a temperature between about 180° C. and 275° C., for a time period effective for at least 10% by weight of the resultant grafted polymer to be grafted monomer units; and recovering the grafted polyketone.

2. The method of claim 1 wherein the functional group is a carboxylic acid group.

3. The method of claim 1 wherein the functional-group-containing monomer is selected from the group consisting of maleic anhydride and derivatives of maleic anhydride.

4. The method of claim 3 wherein the functional-group-containing monomer is maleic anhydride.

5. The method of claim 1 wherein the functional group containing monomer is selected from the group consisting of (meth)acrylic acid, fumaric acid, itaconic acid, crotonic acid, itaconic anhydride, and diethyl fumarate.

6. The method of claim 3 wherein the functional-group-containing monomer and the polyketone are contacted at a temperature of about 200° C.

7. The method of claim 3 wherein the functional-group-containing monomer and the polyketone are contacted for a time period of between 5 minutes and 3 hours.

8. The method of claim 1 wherein the functional group containing monomer and the polyketone are contacted for a time period of between five minutes and three hours.

9. The method of claim 1 wherein contacting the polyketone with a functional group containing monomer is for a time period effective for between 10% and 30% by weight of the resultant grafted polymer to be grafted monomer units.

10. The method of claim 9 wherein the functional group is a carboxylic acid group.

* * * * *